US012347607B2

(12) United States Patent
Oshima et al.

(10) Patent No.: US 12,347,607 B2
(45) Date of Patent: Jul. 1, 2025

(54) MULTI-LAYER COIL COMPONENT

(71) Applicant: TDK CORPORATION, Tokyo (JP)

(72) Inventors: Yuya Oshima, Tokyo (JP); Kenji Komorita, Tokyo (JP); Masayuki Suzuki, Yurihonjo (JP); Yuudai Katou, Yurihonjo (JP); Takeru Sasaki, Tokyo (JP); Shigeshi Osawa, Yurihonjo (JP); Takehiro Ishii, Tokyo (JP); Kouichi Kakuda, Tokyo (JP); Yukio Takahashi, Tokyo (JP); Tsubasa Ozawa, Tokyo (JP); Makoto Yoshino, Tokyo (JP)

(73) Assignee: TDK CORPORATION, Tokyo (JP)

( * ) Notice: Subject to any disclaimer, the term of this patent is extended or adjusted under 35 U.S.C. 154(b) by 721 days.

(21) Appl. No.: 17/705,969

(22) Filed: Mar. 28, 2022

(65) Prior Publication Data

US 2022/0310316 A1 Sep. 29, 2022

(30) Foreign Application Priority Data

Mar. 29, 2021 (JP) ................................ 2021-054929

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01); *H01F 2017/002* (2013.01)

(58) Field of Classification Search
CPC .............. H01F 27/292; H01F 17/0013; H01F 2017/002
See application file for complete search history.

(56) References Cited

U.S. PATENT DOCUMENTS

| | | | | |
|---|---|---|---|---|
| 11,443,898 | B2 * | 9/2022 | Trinh | H01G 4/012 |
| 2010/0097739 | A1 * | 4/2010 | Prymak | H01G 4/12 29/25.42 |
| 2014/0233150 | A1 * | 8/2014 | Chung | H01G 4/12 361/301.4 |
| 2015/0302989 | A1 * | 10/2015 | Choi | H01G 2/14 29/25.03 |
| 2017/0345552 | A1 * | 11/2017 | Nakano | H01F 41/043 |

FOREIGN PATENT DOCUMENTS

| | | | |
|---|---|---|---|
| JP | 2001332439 | A * | 11/2001 |
| JP | 2015-173197 | A | 10/2015 |
| JP | 2015-207750 | A | 11/2015 |
| JP | 2017-212372 | A | 11/2017 |

* cited by examiner

*Primary Examiner* — Malcolm Barnes
(74) *Attorney, Agent, or Firm* — Oliff PLC

(57) ABSTRACT

In the multi-layer coil component, the hole portion is provided in the vicinity of the side surface of the element body, and the distance from the tip position of the external electrode to the hole portion is shorter than the distance from the tip position of the external electrode to the coil. Therefore, when a crack is generated starting from the tip position of the external electrode on the mounting surface, the crack progress toward the hole portion located at a distance closer than the coil. Therefore, in the multi-layer coil component, splitting of the coil due to the crack can be prevented.

8 Claims, 6 Drawing Sheets

MULTI-LAYER COIL COMPONENT

CROSS-REFERENCE TO RELATED APPLICATIONS

This application is based upon and claims the benefit of priority from Japanese Patent Application No. 2021-054929, filed on 29 Mar. 2021, the entire contents of which are incorporated herein by reference.

TECHNICAL FIELD

The present disclosure relates to a multi-layer coil component.

BACKGROUND

Conventionally, known in the art is a multi-layer coil component in which a coil having a coil axis parallel to a stacking direction is provided in an element body having a stacking structure. Japanese Patent Laid-Open No. 2015-173197 (Patent Document 1) discloses a structure where a multi-layer coil component is solder-mounted on a substrate in a posture in which a coil axis of a coil is parallel to the substrate on which the multi-layer coil component is mounted.

SUMMARY

In the multi-layer coil component according to the conventional art described above, when the mounted substrate is bent, bending stresses corresponding to the bending of the substrate are generated in the element body, and a crack may be generated starting from the mounting surface of the element body facing the substrate. The crack tends to propagate parallel to the layers of the element body, and the coil may be split.

According to various aspects of the present disclosure, there is provided a multi-layer coil component in which splitting of a coil due to a crack is prevented.

A multi-layer coil component according to an aspect of the present disclosure includes an element body including a plurality of layers stacked and having a mounting surface parallel to a stacking direction of the plurality of layers and a pair of end surfaces facing each other in a first direction parallel to the stacking direction of the plurality of layers, a coil provided in the element body and having a coil axis parallel to the first direction, a pair of external electrodes continuously extending from each of the end surfaces to the mounting surface of the element body, a pair of lead conductors penetrating a layer of the element body located between the coil and the end surface, the pair of lead conductors being electrically connected to end portions of the coil, the pair of lead conductors being exposed from the end surfaces of the element body and connected to the external electrodes; and a fragile portion provided in a layer through which the lead conductor penetrates, wherein, in a cross section orthogonal to the mounting surface and parallel to the coil axis, a distance from a tip position of the external electrode on the mounting surface to the fragile portion is shorter than a distance from the tip position of the external electrode on the mounting surface to the coil.

In the multi-layer coil component, when a crack is generated starting from the tip position of the external electrode on the mounting surface of the element body, the crack does not progress toward the coil but progresses toward the fragile portion located at a distance closer than the coil. As a result, splitting of the coil due to a crack is effectively prevented.

In the multi-layer coil component according to another aspect, the fragile portion has an elongated shape extending parallel to the first direction.

In the multi-layer coil component according to another aspect, a plurality of the fragile portions is provided in a layer of the element body located between one of the pair of end surfaces and the coil.

In the multi-layer coil component according to the other aspect, in a cross section orthogonal to the mounting surface and parallel to the coil axis, the fragile portion is provided on each of a side of the mounting surface and a side opposite to the mounting surface with respect to the coil axis.

In the multi-layer coil component according to another aspect, the fragile portion is a hole penetrating a layer of the element body.

DETAILED DESCRIPTION

Figure 1:
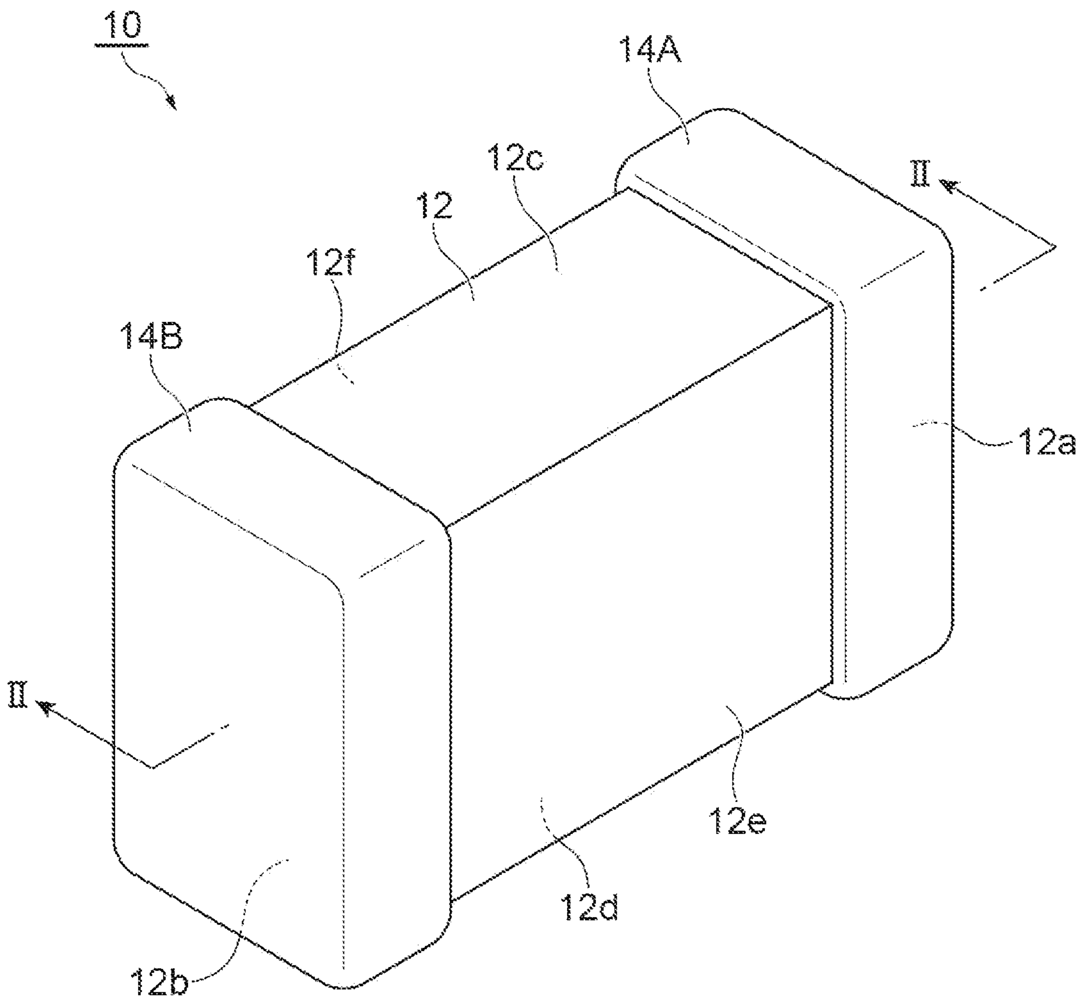
FIG. 1 is a perspective view illustrating a multi-layer coil component according to an embodiment.

Hereinafter, embodiments of the present disclosure will be described with reference to the accompanying drawings. In the description of the drawings, the same or equivalent element is denoted by the same reference numeral, and redundant description is omitted.

A structure of a multi-layer coil component according to an embodiment will be described with reference to FIGS. 1 to 3. As shown in FIG. 1, the multi-layer coil component 10 according to the embodiment includes an element body 12 and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the direction in which the end surfaces 12*a* and 12*b* face each other and connecting the end surfaces 12*a* and 12*b* to each other. In the present embodiment, the side surface 12*d* is a mounting surface facing the mounting base when the multi-layer coil component 10 is mounted, and the side surface 12*c* facing the side surface 12*d* is a top surface when the multi-layer coil component 1 is mounted. When the dimension of the element body 12 in the facing direction of the end surfaces 12*a* and 12*b* is a length, the dimension in the facing direction of the side surfaces 12*e* and 12*f* is a width, and the dimension in the facing direction of the side surfaces 12*c* and 12*d* is a thickness, the dimension of the element body 11 is, for example, 0.7 mm length×0.3 mm width×0.45 mm thickness.

The element body 12 has a structure where an internal conductor 18 is provided inside a magnetic body 16. The element body 12 has a stacking structure. The magnetic body 16 has a stacking structure in which a plurality of magnetic layers 17 are stacked in a direction in which the end surfaces 12*a* and 12*b* face each other. In the present embodiment, the magnetic body 16 has a rectangular outer shape whose long sides are parallel to the facing direction of the side surfaces 12*c* and 12*d* when viewed from the stacking direction of the element body 12. In the following description, the facing direction of the end surfaces 12*a* and 12*b* is also referred to as a stacking direction or a first direction of the element body 12.

The magnetic body 16 is made of a magnetic material such as ferrite. The magnetic body 16 is obtained by stacking a plurality of magnetic sheets (ferrite green sheets) or magnetic pastes (for example, ferrite pastes) to be the magnetic body layers 17 and sintering the stacked magnetic sheets or magnetic pastes. That is, the element body 12 has a stacking structure and is a sintered element body, in which a plurality of magnetic layers 17 are stacked and sintered. The magnetic layer 17 constituting the element body 12 includes magnetic layers 17A in which coil layers 20*b* to 20*e* described later are formed, a magnetic layer 17B in which a connection layer 20*a* described later is formed, a magnetic layer 17C in which a connection layer 20*f* described later is formed, and magnetic layers 17D in which lead layers 23 described later are formed. As an example, the number of magnetic layers 17 constituting the element body 12 is 50 to 60 layers in total, the number of magnetic layers 17A is 40 to 50 layers, and the total number of magnetic layers 17B, 17C, and 17D is 10 to 20 layers. The number of magnetic layers 17 constituting the element body 12 can be increased or decreased as needed. In the actual element body 12, the plurality of magnetic layers 17 are integrated so that boundaries between the layers are not visible.

The thicknesses of the magnetic layers 17 are, for example, 5 to 10 μm for the magnetic layer 17A, 5 to 10 μm for the magnetic layer 17B, 15 to 20 μm for the magnetic layer 17C, and 15 to 20 μm for the magnetic layer 17D. All the magnetic layers 17 may have the same thickness (for example, 20 μm).

The inner conductor 18 includes a coil 20 and a pair of lead conductors 22A and 22B. Each of the coil 20 and the lead conductors 22A and 22B of the inner conductor 18 has a stacking structure in the stacking direction of the element body 12.

Figure 2:
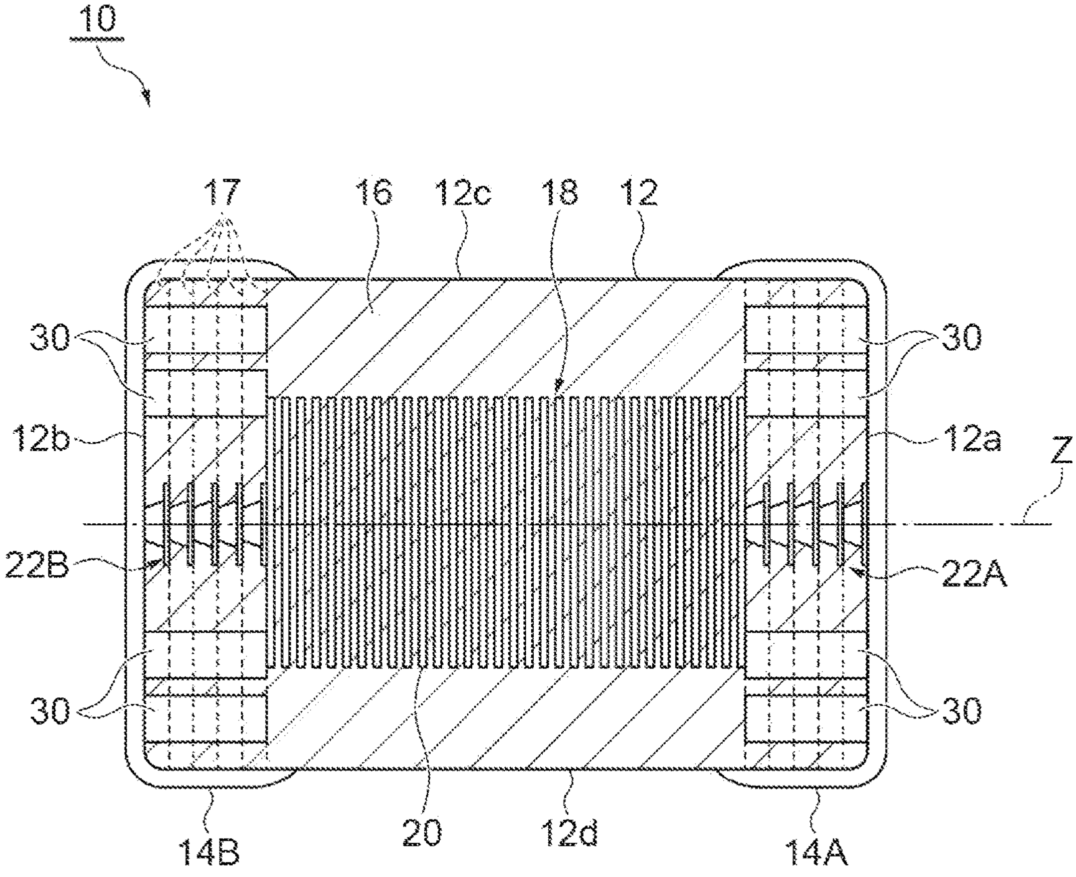
FIG. 2 is a cross-sectional view showing the multi-layer coil component shown in FIG. 1.

As shown in FIG. 2, the coil 20 has a coil axis Z parallel to the stacking direction of the element body 12 and is wound around the coil axis Z. In the present embodiment, the coil 20 has a rectangular annular shape whose long sides are parallel to the facing direction (second direction) of the side surfaces 12*c* and 12*d* when viewed from the stacking direction of the element body 12. In the present embodiment, the coil axis Z is designed to pass through the center of the element body 12 when viewed from the stacking direction of the element body 12.

Figure 3:
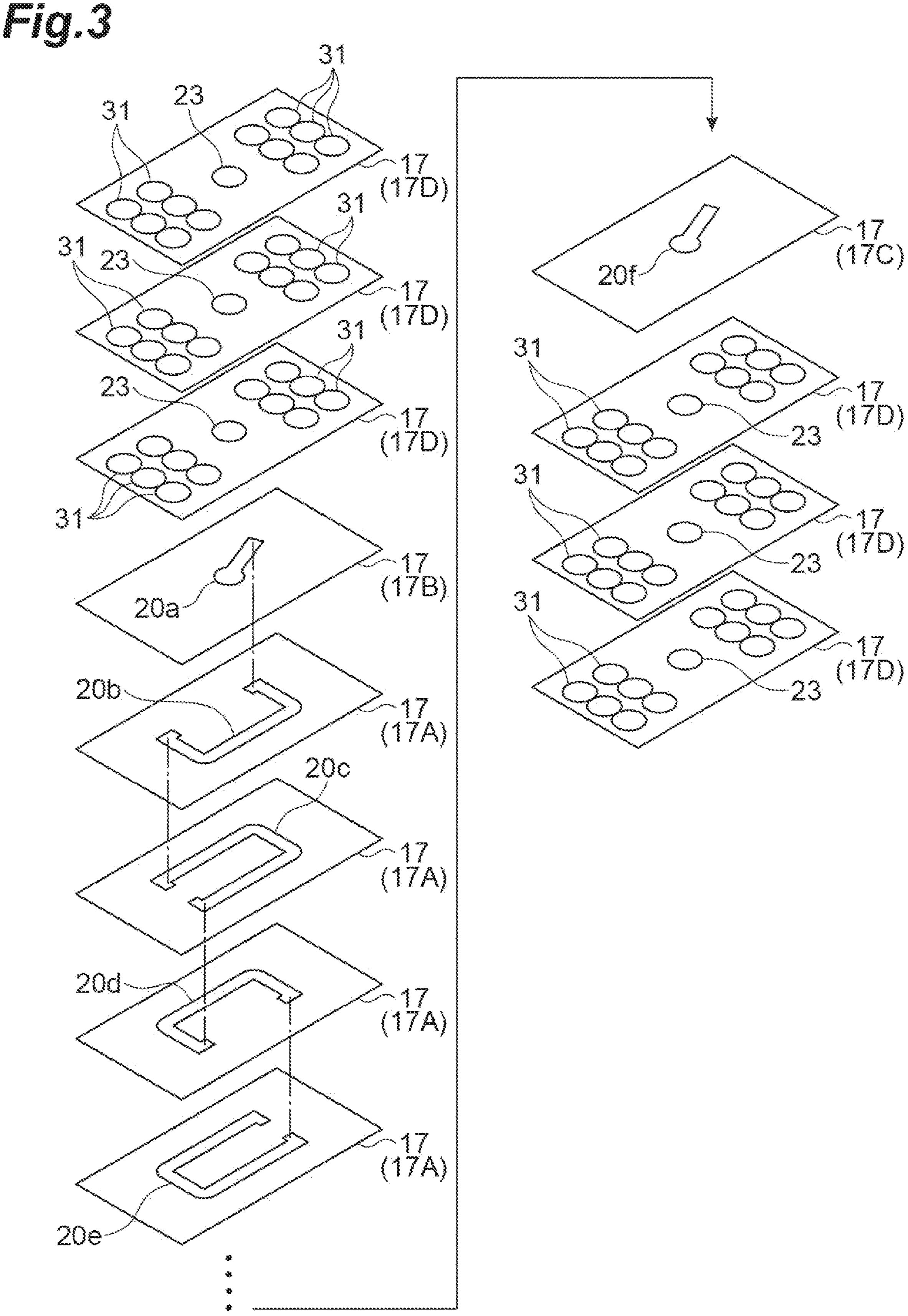
FIG. 3 is an exploded perspective view showing a stacked state of the element body shown in FIG. 1.

In the present embodiment, as shown in FIG. 3, the coil 20 includes connection layers 20*a* and 20*f* and four types of coil layers 20*b* to 20*e*. The connection layers 20*a* and 20*f* and the coil layers 20*b* to 20*e* are made of a conductive material containing a metal such as Ag. The coil 20 is formed by a printing method. Specifically, the coil 20 is obtained by applying a conductive paste (for example, Ag paste) to be the connection layers 20*a* and 20*f* and the coil layers 20*b* to 20*e* onto the green sheets to be the magnetic layers 17A to 17C and sintering the conductive paste.

Each of the coil layers 20*b* to 20*e* has a U-shape when viewed from the stacking direction of the element body 12, and constitutes about ¾ turn of the coil 20. For example, the coil layer 20*b* has a shape including one pair of short side portions and one long side portion of the coil 20 having a rectangular ring shape when viewed from the stacking direction of the element body 12. The coil layer 20*c* has a shape including one pair of long side portions and one short side portion of the coil 20 when viewed from the stacking direction of the element body 12. Similarly to the coil layer 20*b*, the coil layer 20*d* includes one pair of short side portions and one long side portion of the coil 20 when viewed from the stacking direction of the element body 12, and has a point symmetrical relationship with the coil layer 20*b* with respect to the coil axis Z. Similar to the coil layer 20*c*, the coil layer 20*e* includes one pair of long side portions and one short side portion of the coil 20 when viewed from the stacking direction of the element body 12, and has a point symmetrical relationship with the coil layer 20*c* with respect to the coil axis Z.

One set of the coil layers 20*b* to 20*e* arranged in order in the stacking direction of the element body 12 have end portions overlapping with each other in the stacking direction of the element body 12, and are electrically connected to each other via some via conductors (not shown) penetrating the magnetic layers 17A. One set of the coil layers 20*b* to 20*e* constitute three turns of the coil 20. In the present embodiment, the coil 20 includes a plurality of sets of the coil layers 20*b* to 20*e*.

The connection layer 20*a* is provided on the uppermost layer of the coil 20 and constitutes one end portion of the coil 20. The connection layer 20*a* is connected to a lower coil layer via the via conductor, and is connected to the upper lead layer 23 constituting one lead conductor 22A. The connection layer 20*f* is provided in the lowermost layer of the coil 20 and constitutes the other end portion of the coil 20. The connection layer 20*f* is connected to an upper coil layer via the via conductor, and is connected to the lower lead layer 23 constituting the other lead conductor 22B.

The pair of lead conductors 22A and 22B lead out the connection layers 20*a* and 20*f* constituting the end portions of the coil 20 to the end surfaces 12*a* and 12*b* of the element body 12. Each of the pair of lead conductors 22A and 22B is electrically connected to the connection layers 20*a* and 20*f* constituting the end portion of the coil 20. The pair of lead conductors 22A and 22B are exposed from the end surfaces 12*a* and 12*b* of the element body 12 and connected to the pair of external electrodes 14A and 14B, respectively.

Each of the pair of lead conductors 22A and 22B is provided to penetrate the magnetic layer 17D located between the coil 20 and the end surfaces 12*a* and 12*b* of the element body 12. Each of the pair of lead conductors 22A and 22B has a structure in which a plurality of lead layers 23 are stacked. In FIG. 3, three lead layers 23 stacked are shown. Each of the lead layers 23 is provided at the center of the magnetic layer 17D through which the coil axis Z pass. Each of the lead layers 23 is made of a conductive material containing a metal such as Ag. Each of the lead layers 23 is obtained by filling a conductive paste (for example, Ag paste) to be the lead layer 23 into a through hole provided in a green sheet to be the magnetic layer 17D and sintering the conductive paste.

Figure 4A:
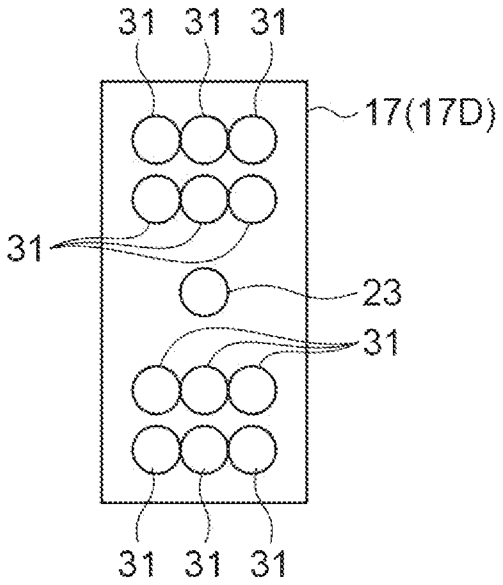
FIGS. 4A and 4B are plan views showing the magnetic layer provided with holes shown in FIGS. 2 and 3.

As shown in FIG. 4A, the magnetic layer 17D provided with the lead layer 23 is provided with two sets of holes 31 at positions sandwiching the lead layer 23 in the long-side direction of the magnetic layer 17D. Each set of the holes 31 includes six circular holes 31, and the six holes 31 are arranged in two lines along the short-side direction of the magnetic layer 17D. In the magnetic layers 17D vertically overlapping in the stacking direction of the element body 12, the positions of the holes 31 coincide with each other. Therefore, when the magnetic layers 17D provided with the lead layers 23 are overlapped with each other, the holes 31 provided in the respective magnetic layers 17D communicate with each other, and elongated hole portions 30 extending across the plurality of magnetic layers 17D and extending in parallel to the stacking direction of the element body 12 are formed.

The pair of external electrodes 14A and 14B are provided on the end surfaces 12*a* and 12*b* of the element body 12, respectively. In the present embodiment, the external electrode 14A integrally covers the entire region of the end surface 12*a* and the side surfaces 12*c* to 12*f* of the region adjacent to the end surface 12*a*. Similarly, the external electrode 14B integrally covers the entire region of the end surface 12*b* and the side surfaces 12*c* to 12*f* of the region adjacent to the end surface 12*b*. FIG. 2 shows that the external electrodes 14A and 14B continuously extend from the end surfaces 12*a* and 12*b* to the side surfaces 12*c* and 12*d* of the element body 12. In the present embodiment, the external electrodes 14A and 14B on the side surfaces 12*c* and 12*d* extend beyond the lead conductors 22A and 22B to a position overlapping the coil 20. Each of the external electrodes 14A and 14B includes one or more electrode layers. For example, a metallic material such as Ag can be used as an electrode material constituting each of the external electrodes 14A and 14B.

Figure 5:
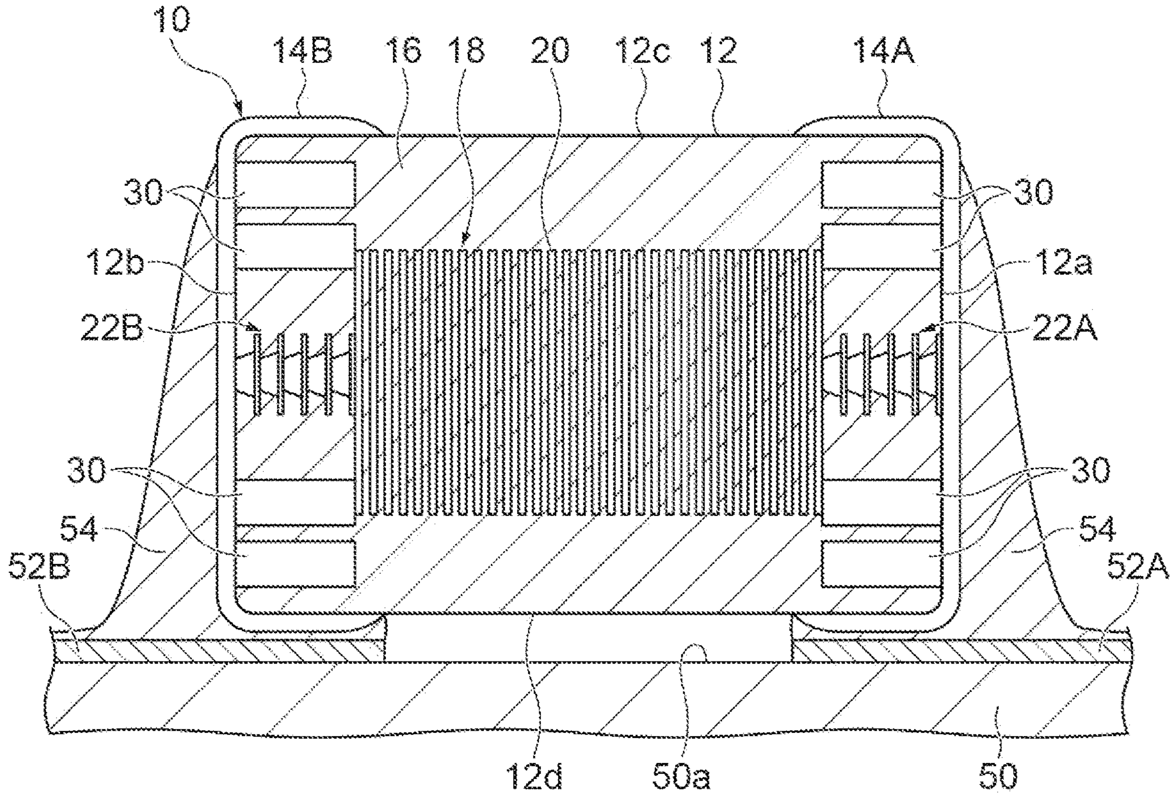
FIG. 5 is a cross-sectional view showing a state in which the multi-layer coil component shown in FIG. 2 is mounted.

The multi-layer coil component 10 described above can be mounted on the substrate 50 by soldering as shown in FIG. 5. More specifically, the multi-layer coil component 10 is mounted on the electrodes 52A and 52B of the substrate 50 in a posture in which the coil axis Z of the coils 20 are parallel to the main surface 50*a* of the substrate 50, and is mounted by the solder 54.

Here, when the substrate 50 is bent, bending stresses corresponding to the bending of the substrate 50 are generated in the element body 12 of the multi-layer coil component 10, and a crack may occur in the element body 12. The starting point of the crack may be a portion where stresses are likely to concentrate, that is, a tip position P of the external electrodes 14A and 14B on the mounting surface 12*d* of the element body 12 facing the substrate 50. When the crack progresses in parallel to the magnetic layer 17 of the element body 12 (that is, along the thickness direction of the element body 12), the coil 20 may be split by the crack.

Figure 6:
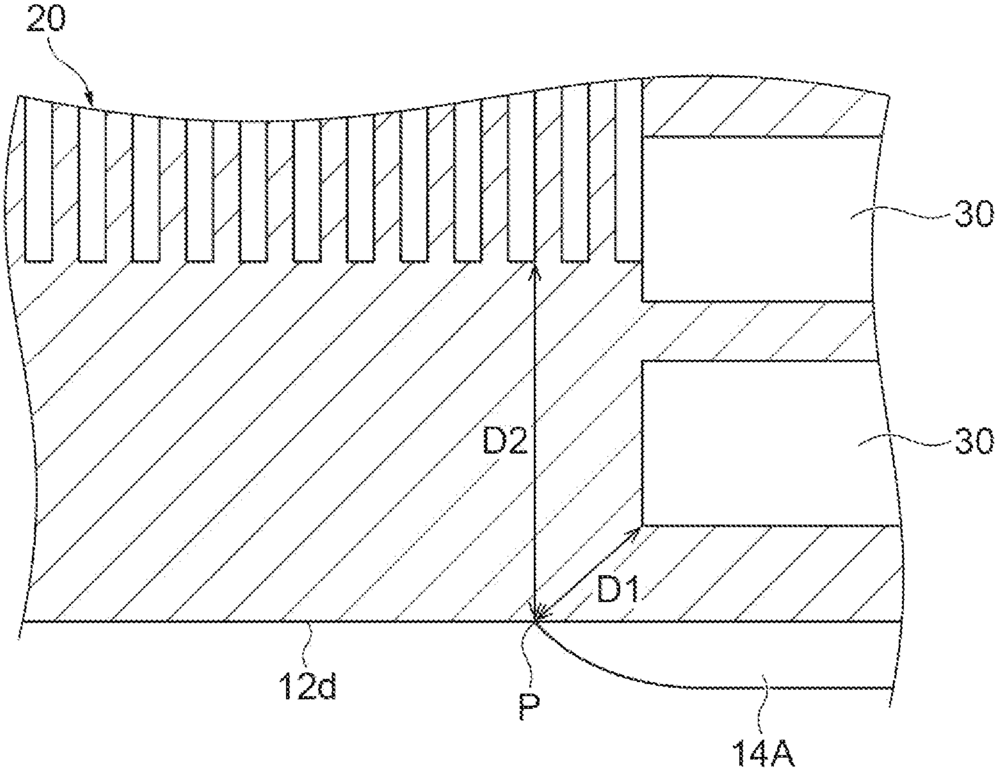
FIG. 6 is an enlarged view of a main part of FIG. 5.

In the multi-layer coil component 10 described above, the hole portion 30 (fragile portion) is provided in the magnetic layer 17D in which the lead conductors 22A and 22B are provided. Since the hole portion 30 is a depletion portion, the mechanical strength of the inside and the periphery of the hole portion 30 is lower than the mechanical strength of the portion where the magnetic material constituting the magnetic body 16 is present. As shown in FIG. 6, the hole portion 30 is provided in the vicinity of the side surface 12*d* of the element body 12, and the distance D1 from the tip position P of the external electrodes 14A and 14B to the hole portion 30 is designed to be shorter than the distance D2 from the tip position P of the external electrodes 14A and 14B to the coil 20.

Therefore, when a crack is generated starting from the tip position P of the external electrodes 14A and 14B on the mounting surface 12*d* of the element body 12, the crack does not progress in the thickness direction of the element body 12 toward the coil 20, but progress in a direction intersecting the thickness direction of the element body 12 toward the hole portion 30 located at a distance closer than the coil 20. Therefore, in the multi-layer coil component 10, splitting of the coil 20 due to a crack 20 is effectively prevented.

Figure 4B:
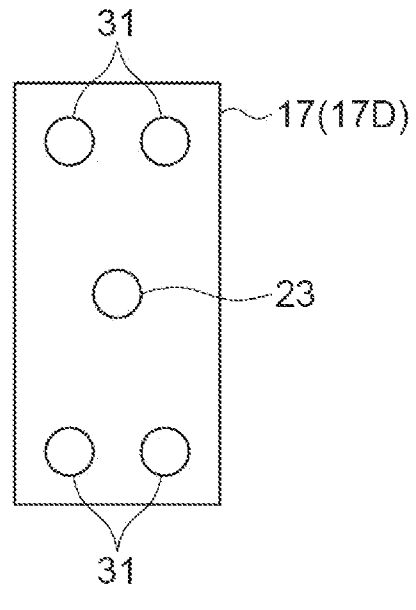

The cross-sectional shape of the hole 31 constituting the hole portion 30 is not limited to a circular shape, and may be a polygonal shape or an elliptical shape. The positions of the holes 31 and the positions of the holes 31 in the magnetic layer 17D can be changed as needed. For example, as shown in FIG. 4B, four holes 31 may be arranged at four corners of the magnetic layer 17D. Further, two sets of holes 31 may be provided at positions sandwiching the lead layer 23 in the thickness direction of the element body 12. In this case, in a cross section orthogonal to the mounting surface 12*d* and parallel to the coil axis Z, a set of the holes 31 is arranged on each of the side of the mounting surface 12*d* and the side opposite to the mounting surface 12*d* with respect to the coil axis Z. Accordingly, the hole portion 30 can be disposed in the vicinity of both the side surface 12*d* and the side surface 12*c* of the element body 12. The hole portion 30 may be disposed only in the vicinity of the side surface 12*d* of the element body 12.

The holes 31 adjacent to each other in the stacking direction of the element body 12 may or may not communicate with each other.

Although the embodiments of the present disclosure have been described above, the present disclosure is not necessarily limited to the above-described embodiments, and various modifications can be made without departing from the gist thereof.

For example, the fragile portion may be hollow or solid. For example, the fragile portion may have a structure in which a through hole provided in a layer constituting the element body is filled with a filler. As the filler, a material (for example, a metal material such as Ag) that is more resistant to brittle fracture than the material of the layer constituting the element body can be employed.

The shape of the coil is not limited to the rectangular ring shape, and may be a square ring shape, a polygonal ring shape, a circular ring shape, or an elliptical ring shape. In the case that the coil has a square ring shape, the end surface shape and the cross-sectional shape of the element body may be a square.

The height position of the coil (i.e., the height position of the coil axis) of the element body with respect to the mounting surface is not limited to the intermediate position of the element body (position dividing the element body into two equal parts), and may be a position biased toward the side of the top surface facing the mounting surface.

What is claimed is:

1. A multi-layer coil component comprising:

an element body including a plurality of layers stacked and having a mounting surface parallel to a stacking direction of the plurality of layers and a pair of end surfaces facing each other in a first direction parallel to the stacking direction of the plurality of layers;

a coil provided in the element body and having a coil axis parallel to the first direction;

a pair of external electrodes continuously extending from each of the end surfaces to the mounting surface of the element body;

a pair of lead conductors penetrating through a plurality of layers of the element body located between the coil and the end surface, the pair of lead conductors being electrically connected to end portions of the coil, the pair of lead conductors being exposed from the end surfaces of the element body and connected to the external electrodes; and a fragile portion provided in the plurality of layers through which the lead conductor penetrates, and extending in a row in parallel with the first direction, wherein, in a cross section orthogonal to the mounting surface and parallel to the coil axis, a distance from a tip position of the external electrode on the mounting surface to the fragile portion is shorter than a distance from the tip position of the external electrode on the mounting surface to the coil.

2. The multi-layer coil component according to claim 1, wherein the fragile portion has an elongated shape extending parallel to the first direction.

3. The multi-layer coil component according to claim 2, wherein the fragile portion reaches and contacts the coil.

4. The multi-layer coil component according to claim 1, wherein a plurality of the fragile portions is provided in a layer of the element body located between one of the pair of end surfaces and the coil.

5. The multi-layer coil component according to claim 4, wherein, in a cross section orthogonal to the mounting surface and parallel to the coil axis, the fragile portion is provided on each of a side of the mounting surface and a side opposite to the mounting surface with respect to the coil axis.

6. The multi-layer coil component according to claim 4, wherein, in a cross section orthogonal to the mounting surface and parallel to the coil axis, two of the fragile portions are provided on the mounting surface side with respect to the coil axis.

7. The multi-layer coil component according to claim 1, wherein the fragile portion is a hole penetrating a layer of the element body.

8. The multi-layer coil component according to claim 1, wherein the cross-sectional shape of the fragile portion is a circular shape.

* * * * *